Oct. 12, 1948.  F. D. BRADDON ET AL  2,450,875
GYROSCOPIC INSTRUMENT

Filed Oct. 8, 1943  2 Sheets-Sheet 1

INVENTORS:
F. D. BRADDON
L. F. BEACH
BY Herbert H. Thompson
THEIR ATTORNEY

Oct. 12, 1948.  F. D. BRADDON ET AL  2,450,875
GYROSCOPIC INSTRUMENT
Filed Oct. 8, 1943  2 Sheets-Sheet 2

INVENTORS:
F. D. BRADDON
L. F. BEACH
BY Herbert H. Thompson
THEIR ATTORNEY

Patented Oct. 12, 1948

2,450,875

UNITED STATES PATENT OFFICE 2,450,875

GYROSCOPIC INSTRUMENT

Frederick D. Braddon, Babylon, and Lennox Frederick Beach, Port Washington, N. Y., assignors to The Sperry Corporation, a corporation of Delaware Application October 8, 1943, Serial No. 505,512

11 Claims. (Cl. 33—204)

This invention relates to gyroscopic instruments and more particularly pertains to a mounting for the rotor case of such an instrument by which a condition of gimbal lock is prevented.

The primary feature of the present invention resides in the provision of an auxiliary gimbal for carrying the gyro rotor case with releasable means between the case and auxiliary gimbal in the form of a coupling that normally locks the named parts together.

A further feature of the invention is provided by a coupling mechanism for the auxiliary gimbal and gyro rotor case that is released under the control of the main gimbal of the instrument.

Another feature of the invention resides in the means provided for controlling the horizon bar of a gyroscopic artificial horizon designed to provide full freedom in all axes as in an instrument of this character.

Other features and structural details of the invention will be apparent from the following description when read in relation to the accompanying drawings, wherein Fig. 1 is a front elevation view of a gyroscopic instrument of the artificial horizon type in which the present invention is embodied.

Figure 1:
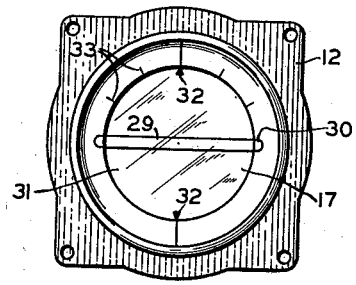
Figure 2:
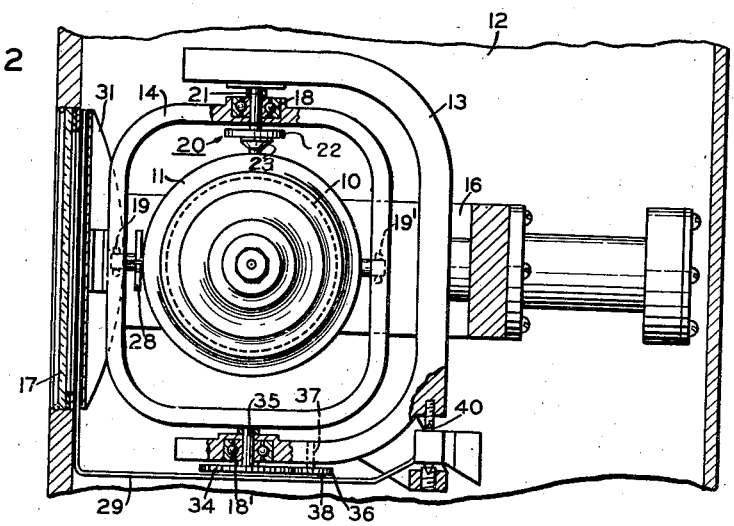
Fig. 2 is an enlarged plan view of the interior of the instrument.
Figure 3:
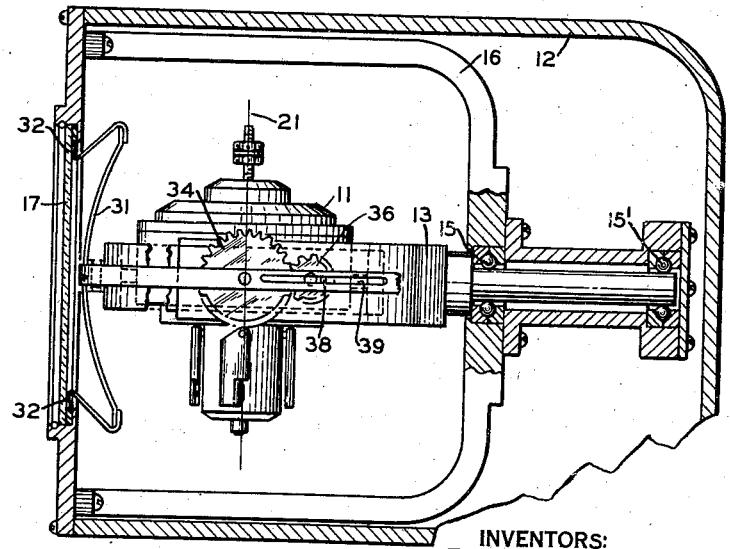
Fig. 3 is a side elevation view of the parts illustrated in Fig. 2.

With reference to the artificial horizon form of gyroscopic instrument shown in Figs. 1 to 3, inclusive, a gyro rotor 10 whose spin axis is normally vertical is mounted within a rotor bearing case 11 of conventional construction. In accordance with the teaching of the present invention, the rotor case is supported within the casing 12 of the instrument by means of a main gimbal 13 and an auxiliary gimbal 14 in the novel manner hereinafter described. As shown in Fig. 2, the major axis of the bearing case 10 on the main gimbal is defined by the bearings 15, 15', the axially spaced outer races of which are located in a frame 16 that is fixed to the outer casing 12. Gimbal 13 is U-shaped and the open position thereof is disposed adjacent the window 17 in the front wall of the casing 12 for the instrument.

The auxiliary gimbal 14 is pivotally mounted in the main gimbal by means of bearings 18, 18', and the rotor case 11 is pivotally mounted on the auxiliary gimbal by means of bearings 19, 19'. As shown, the major axis of the case on the auxiliary gimbal 14, bearings 18, 18', corresponds with the minor axis of the case, also defined by bearings 18, 18', on the main gimbal 13. Also, the minor axis of the case 11 on the auxiliary gimbal defined by bearings 19, 19', normally corresponds with the major axis of the case on the main gimbal. It will be understood that the major axis of a gimbal supported rotor case is the axis of the gimbal; i. e., the major axis of case 10 on main gimbal 13 is defined by the bearings 15, 15' and the major axis of case 10 on auxiliary gimbal 14 is defined by the bearings 18, 18'. Further, the minor axis of the rotor case 10 is the axis of the case within the gimbal; i. e., the minor axis of case 10 on main gimbal 13 is defined by bearings 18, 18' and the minor axis of the case on auxiliary gimbal 14 is defined by bearings 19, 19'. From the above it is clear that the axis defined by bearings 18, 18' is considered as a major axis of support of the case with regard to auxiliary gimbal 14 and is also considered as a minor axis of support of the case with regard to the main gimbal 13. Relative to the gimbal axes per se, the axis of main gimbal 13 is defined by bearings 15, 15'. Further, the axis of auxiliary gimbal 14 is defined by bearings 18, 18'. The axis of the rotor case 10 on gimbal 14 is defined by bearings 19, 19', this axis normally corresponding with the axis of the main gimbal as clearly shown in Figs. 2 and 3. In accordance with the teaching of the invention, a releasable coupling as generally indicated at 20 is employed between the rotor case and auxiliary gimbal. Coupling 20 functions to normally lock the case to the auxiliary gimbal so that no movement of the case relative to the auxiliary gimbal about the axis defined by bearings 19, 19' can occur. With the case and auxiliary gimbal locked together, the case is universally supported by the main gimbal 13. Mutually perpendicular, major axis defined by bearings 15, 15' and minor axis defined by bearings 18, 18' provide this normal universal mounting for the case. With this type of gyroscopic instrument upon pitch of the craft on which the instrument is mounted the casing 12 may move about the athwartship axis of the craft to a position in which the main gimbal axis defined by bearings 15, 15' is coincident with the spin axis of the gyro rotor as indicated at 21 in Fig. 3. This condition, known as gimbal lock, is prevented in the improved instrument by means of the auxiliary gimbal 14 and the coupling 20 which cooperate in the manner hereinafter described.

Figure 4:
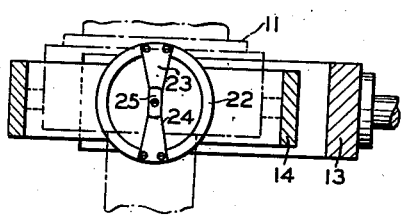
Fig. 4 is a further enlarged detail side elevation of one of the forms of coupling means shown herein between the rotor case and the auxiliary gimbal of the instrument.
Figure 5:
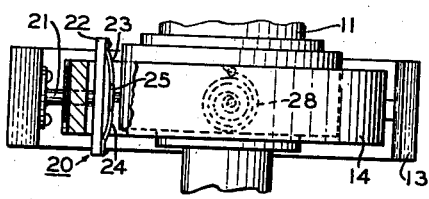
Fig. 5 is a side elevation view of the coupling illustrated in Fig. 4 taken at right angles to the showing thereof in the previous figure.
Figure 6:
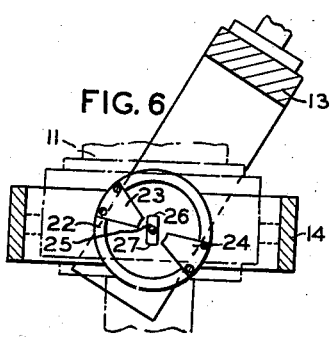
Fig. 6 is a view similar to Fig. 4 with the main gimbal tipped out of a normal position, the same showing the manner in which the coupling is released.

As particularly shown in the form of coupling means illustrated in Figs. 4 to 6, inclusive, a stub shaft 21 is fixed to the main gimbal 13. At the end of the fixed shaft 21 is located a holding piece 22 for two, arcuate slot defining, resilient arms 23 and 24. Arms 23 and 24 are curved as particularly shown in Fig. 5. The inner race for bearing 18 is fixed in position on the stub shaft 21. The other part of the coupling means shown in Figs. 4 to 6, inclusive, is a pin 25 that extends from and is fixed to the rotor case 11. Pin 25 is constructed to include cam surfaces 26 and 27 which frictionally engage the arcuate ends of the resilient springs 23 and 24, as particularly shown in Fig. 4 to normally secure the case from movement about the auxiliary gimbal axis thereof defined by bearings 19, 19'.

In accordance with the teaching of the present invention, the coupling means is released under control of the main gimbal 13 when the latter becomes inclined through a substantial angle approaching 90°. If the major axis 15, 15' is placed fore and aft, as is usual, the cause of the condition shown in Fig. 6 would be a steep dive of the craft. When the instrument thus tilts of the craft. When the instrument thus tilts about a pitch axis the main gimbal 13 moves out of a horizontal plane about axis 18, 18'. This causes corresponding movement of the holding piece 22 and the arms thereon so that the straight sided pin 25 is no longer held in a locked condition. Thus, when the main gimbal becomes inclined through a substantial angle approaching 90° which would otherwise cause gimbal lock, the rotor case is then universally supported within the casing on the auxiliary gimbal on axes 18, 18' and 19, 19'. Spring means 28 between the trunnion of the case 11 and gimbal 14 effects movement of the case about axis 19, 19' to restore the coupling to a normal locking condition. The resilient arms 23 and 24 are curved to permit the parts of the coupling to slide over each other if necessary in effecting their engagement as the main gimbal returns to a normal position with the case free from tilt about the axis 19, 19'.

In the instrument shown, the rotor is air driven and the rotor case is pneumatically erected by suitable means well known in the art and with which this inventive subject matter is not concerned. The pendulous shutters shown on the case 11 in Fig. 3 provide the conventional erection controls for the instrument.

To obtain an artificial horizon indication from the described type of gyroscopic instrument, a horizon bar 29 is employed. Bar 29 is observed with reference to pitch indices 30 located on the window 17 of the casing 12 of the instrument. A mask 31 is fixed to the front of the auxiliary gimbal 14 behind the window and the observed portion of the bar 29 which conceals the interior parts of the instrument from observation. Roll indices 32 may be fastened to the mask 31, the same being observed with reference to a scale 33 on the window 17 of the instrument.

In accordance with the teaching of the present invention, a mechanism that is positioned by the auxiliary gimbal is employed to control the horizon bar 29. As shown, this mechanism includes a first pinion 34 that is fixed on the extending end of the trunnion 35 of the auxiliary gimbal 14. Pinion 34 meshes with a second gimbal pinion 36 that is mounted on the main gimbal 13 on a stub shaft 37. A pin 38 that is eccentrically located on the pinion 36 engages a longitudinal slot 39 in the horizon bar. The horizon bar 29 is pivotally mounted on the main gimbal as indicated at 40. In the improved bar mechanism provided, the meshing gears or pinions 34, 36 have a 2 to 1 gear ratio. Such ratio is required in order to maintain pin 38 in a uniform normal position in the slot 39 in order to obtain a correct indication from the bar both when the casing 12 of the instrument as viewed in Fig. 3 is turned 180° about the pitch axis of the instrument or axis of the auxiliary gimbal ring 14 and when the main gimbal is displaced in position about its axis 180° from the position in which it is shown in Fig. 2. The improved artificial horizon instrument is completely maneuverable about both roll and pitch axes of the craft on which it is mounted.

Figure 7:
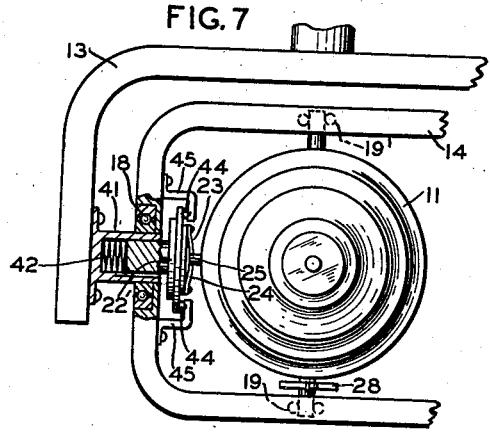
Fig. 7 is a plan view, partly in section, showing a modified form of coupling means.
Figure 8:
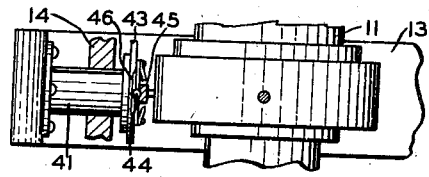
Fig. 8 is a side elevation view of the coupling illustrated in Fig. 7.
Figure 9:
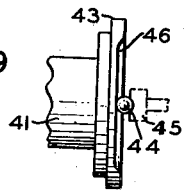
Fig. 9 is an enlarged detail view of the coupling as shown in Fig. 8.

A modified form of the coupling means is shown in Figs. 7, 8 and 9, in which the holding surfaces of the curved springs 23 and 24 can substantially surround a round pin 25 and thus increase the holding action of the couple over the type previously described. In the present couple the spring holding piece is axially movable so that the same moves away from the pin when the couple is released. A holding piece 22' is constructed to slide in a hollow trunnion 41, the piece being pressed by a spring 42 within the trunnion so that the cam defining flange 43 is continuously urged against two balls 44 that are located in respective brackets 45 fixed to the auxiliary gimbal 14. The flange has two opposite depressions therein as indicated at 46, Fig. 8, by which the holding piece 22' is permitted to move to a position in which the springs 23, 24 thereof engage the pin 25. Piece 22' is held against rotation in the hollow trunnion 41 by a suitable axial groove and key connection between the parts. When the gimbal 13 moves out of a normal position, trunnion 41 and holding piece 22' turn therewith. The cam defining flange also turns so that the balls 44 ride upon the high surface thereof and push the piece 22' further within the hollow trunnion against the action of the spring 42. This moves the holding springs out of engagement with the pin 25 to free the rotor case 11 so the same can move about its axis 19, 19'.

Figure 10:
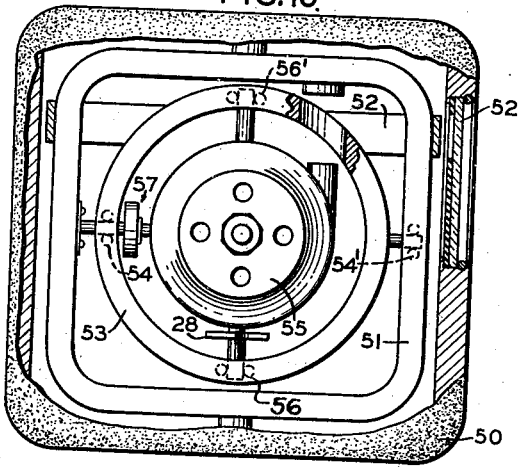
Fig. 10 is a side elevation view showing the interior of a gyroscopic instrument of the directional gyro type in which the present inventive concepts are embodied.

With reference to Fig. 10, a gyroscopic instrument of the direction indicating type is shown incorporating the features of the present invention. The casing of this instrument is indicated at 50. Within the casing 50, a vertical ring 51 is mounted to pivot about a vertical axis, the ring having a compass card 52 thereon that is observed with reference to a suitable lubber line on the window 52' in the front wall of the instrument. The auxiliary gimbal employed in this instance is indicated at 53, the same moving about a normally horizontal axis as defined by the bearings 54, 54' on the vertical ring 51. The rotor case 55 of the instrument is pivotally mounted on the auxiliary gimbal by means of bearings 56, 56' whose axis normally corresponds with the axis of the vertical ring. The releasable coupling is indicated at 57, the same normally preventing movement of the case 55 about the axis defined by bearings 56, 56'. In this instance, the coupling 57 is released due to movement of the casing 50, and ring 51 about the roll axis of the craft so that when the spin axis of the rotor in the case 55 which is normal to the plane of the paper as viewed in this figure becomes coincident with the axis of the vertical ring 51, the rotor case is universally supported on the auxiliary gimbal 53 on mutually perpendicular axes defined by bearings 56, 56' and bearings 54, 54'.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A mounting for the rotor case of a gyro instrument comprising a main gimbal on which the rotor case is normally supported for universal movement about mutually perpendicular major and minor axes, an auxiliary gimbal carrying the rotor case and pivotally mounted on the main gimbal, the major axis of the case on the auxiliary gimbal corresponding with the minor axis of the case on the main gimbal and the minor axis of the case on the auxiliary gimbal normally corresponding with the major axis of the case on the main gimbal, and a releasable coupling between the rotor case and auxiliary gimbal normally locking the case and auxiliary gimbal together, said coupling being released by the main gimbal upon movement of the same relative to the auxiliary gimbal through a predetermined angle to prevent a condition of gimbal lock from occurring in the instrument.

2. A mounting as claimed in claim 1, including spring means between the rotor case and auxiliary gimbal effective to move said rotor case towards its normally locked position.

3. A mounting as claimed in claim 1, in which said coupling includes a pin extending from the rotor case and an axially movable, holding piece mounted on the main gimbal, said holding piece and pin moving out of locking engagement to free the auxiliary gimbal.

4. Means for preventing a gimbal lock condition in a gyroscopic instrument having a rotor case, said means including a main gimbal, an auxiliary gimbal carrying said case pivotally mounted on the main gimbal with the axes of the respective gimbals mutually perpendicular, and a coupling, one part of which is located on the case and the other part of which is situated on the main gimbal, that normally locks the auxiliary gimbal to the case, the connecting ends of the respective coupling parts being constructed to release the auxiliary gimbal from a locked condition when the main gimbal is inclined more than a predetermined amount from its normal position relative to the auxiliary gimbal.

5. A gyro vertical instrument having, a casing, a main gimbal in said casing, an auxiliary gimbal pivotally mounted on said main gimbal, said gimbals being arranged with their respective axes mutually perpendicular, a gyro rotor case pivotally mounted on said auxiliary gimbal with the axis thereof normally corresponding with the axis of the main gimbal, and a releasable coupling normally locking the case to the auxiliary gimbal, said coupling being released upon a substantial tilt of said main gimbal about the axis of the auxiliary gimbal.

6. A directional gyro instrument having a casing, a ring pivotally mounted in said casing to move about a normally vertical axis, an auxiliary ring pivotally mounted on said first ring movable about a normally horizontal axis, a gyro rotor case pivotally mounted on said auxiliary ring with the axis thereof normally corresponding with the axis of the first ring, a coupling normally locking the case to the auxiliary ring, and means for releasing said coupling upon movement of said first ring relative to said auxiliary ring through a substantial angle.

7. A gyroscopic artificial horizon including a main gimbal pivotally mounted on a casing, an auxiliary gimbal pivotally mounted on said main gimbal, said gimbals being arranged with their respective axes mutually perpendicular, a gyro rotor case pivotally mounted on said auxiliary gimbal with its pivotal axis normally aligned with the axis of the main gimbal, a horizontal bar pivotally mounted on the main gimbal, and mechanism driven by said auxiliary gimbal for controlling the horizon bar.

8. An instrument of the character claimed in claim 7, in which said mechanism includes a first pinion mounted on the trunnion of the auxiliary gimbal, and a second pinion with half the teeth of the first pinion having a pin thereon that engages a slot in the horizon bar, said pinions being in meshing engagement.

9. An instrument of the character claimed in claim 7, which includes a releasable coupling between the case and the auxiliary gimbal that normally locks the case and auxiliary gimbal together.

10. A completely maneuverable gyroscopic artificial horizon having a gimbal mounted rotor case including a longitudinally slotted horizon bar pivotally mounted in the gimbal, and mechanism for positioning the bar comprising first and second engaged gear means having a 2 to 1 gear ratio, the first and larger of which is positioned by the rotor case and the second and smaller of which is rotatably mounted on the gimbal, said second gear having a pin engaging the slot in the horizon bar.

11. In a gyroscopic artificial horizon, a casing having a window with a roll scale thereon, a main gimbal therein, an auxiliary gimbal pivotally mounted on said main gimbal, said gimbals being arranged with their respective axes mutually perpendicular and normally horizontal, a gyro rotor case pivotally mounted on said auxiliary gimbal with the axis thereof normally corresponding with the axis of the main gimbal, and a roll index cooperating with the scale mounted on said auxiliary gimbal.

FREDERICK D. BRADDON.
LENNOX FREDERICK BEACH.

REFERENCES CITED

The following references are of record in the file of this patent:

UNITED STATES PATENTS

| Number | Name | Date |
| --- | --- | --- |
| 1,825,345 | Fieux | Sept. 29, 1931 |
| 2,044,150 | Carlson | June 16, 1936 |
| 2,232,537 | Kollsman | Feb. 18, 1941 |
| 2,392,494 | Murtagh et al. | Jan. 8, 1946 |

Certificate of Correction

Patent No. 2,450,875.　　　　　　　　　　　　　　　　　　October 12, 1948.

FREDERICK D. BRADDON ET AL.

It is hereby certified that error appears in the printed specification of the above numbered patent requiring correction as follows:

Column 6, line 20, claim 7, for the word "horizontal" read *horizon*;

and that the said Letters Patent should be read with this correction therein that the same may conform to the record of the case in the Patent Office.

Signed and sealed this 17th day of May, A. D. 1949.

[SEAL]

THOMAS F. MURPHY,
*Assistant Commissioner of Patents.*